(No Model.)
M. WARREN.
APPARATUS FOR RACKING BEER.
No. 558,131. Patented Apr. 14, 1896.
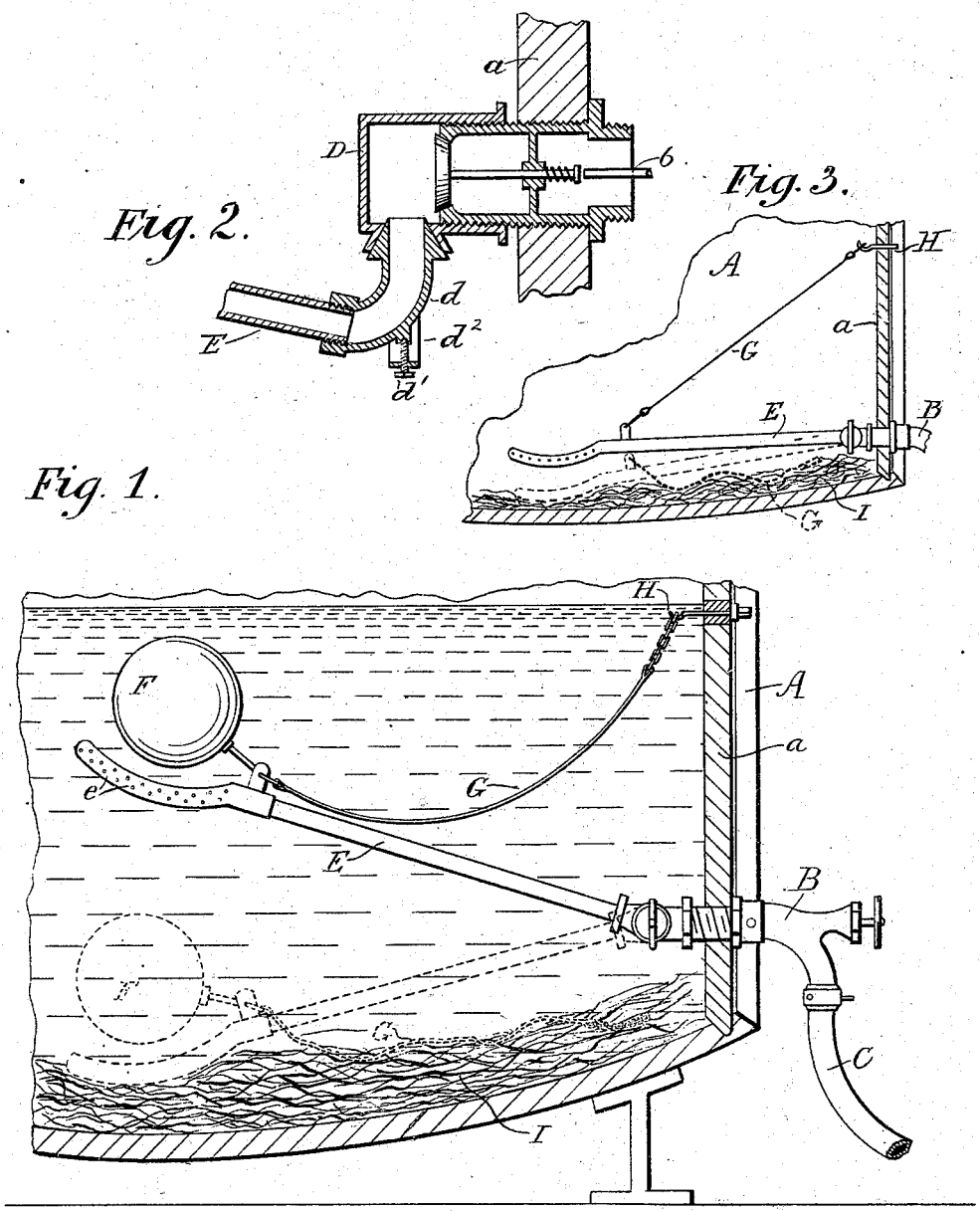
WITNESSES:
W. W. Shaw
F. B. Packard
INVENTOR
Marion Warren
BY
Murphey & Metcalf
ATTORNEYS

UNITED STATES PATENT OFFICE.

MARION WARREN, OF ROCHESTER, NEW YORK.

APPARATUS FOR RACKING BEER.

SPECIFICATION forming part of Letters Patent No. 558,131, dated April 14, 1896.

Application filed March 9, 1895. Serial No. 541,080. (No model.)

*To all whom it may concern:*

Be it known that I, MARION WARREN, a citizen of the United States, and a resident of the city of Rochester, county of Monroe, and State of New York, have invented certain new and useful Improvements in Apparatus for Racking Beer, of which the following is a full, clear, and exact description, reference being had to the accompanying drawings, forming part of this specification.

My invention, while not limited to such use, is particularly adapted for employment in the manufacture of beer by the process in very general use in which the beer is subjected to a secondary fermentation in "chip-casks," and is then "racked" into the barrels or kegs from which it is drawn for consumption. These chip-casks are of large capacity, containing many barrels, and hold the beer while undergoing its secondary fermentation, which is produced by the addition of a quantity of young beer, called "kraeusen." In them also the beer is clarified by the addition of "finings," which carry down any yeast particles or other sedimentary matter toward the bottom of the casks. The bottom of these casks is covered with a layer of "chips" or "shavings," usually of beechwood, upon which the particles carried down by the finings settle and to which they adhere, leaving the beer bright and clear.

In racking off the beer from the chip-casks it is essential that the shavings in the bottom of the casks should not be disturbed, and to prevent such disturbance it has been customary to attach the racking-hose, through which the beer is drawn from the cask, to a faucet or valve located well above the upper surface of the chips. This arrangement, while preventing the outflowing beer from disturbing the shavings and the sediment deposited thereon, necessarily left a large amount of beer in the belly or bilge of the cask which could not be drawn off without disturbing the sedimentary deposit on the chips. It has therefore been customary, when the beer was racked to the level of the racking-valve, to disconnect the racking-hose, open the cask, and insert a hose therein, through which the remaining beer was returned to the storage vats for re-treatment. This manner of disposing of the beer remaining after racking is very objectionable on account of the waste, the lack of cleanliness, and the impossibility of taking out any of the beer below the level of the valve should the condition of the contents of any particular cask permit it, as is frequently the case.

The object of my invention is the provision of apparatus by which these objections are obviated; and to this end it consists in the combination, with the racking-valve, of a movable outlet-tube connected therewith and means for supporting the tube in the cask.

It consists, further, of the novel combination and arrangement of parts and details of construction herein shown and described, and specifically pointed out in the claims.

In the accompanying drawings, Figure 1 is a longitudinal vertical section of a shavings-cask to which my invention is attached. Fig. 2 is a horizontal section showing the manner in which I prefer to connect the outlet-tube with the racking-valve; and Fig. 3 is a longitudinal vertical section of a cask, showing a modification of my invention in a simplified form.

Similar reference-characters are employed to designate corresponding parts in all the views.

The shavings-cask A rests on suitable supports, and in the head *a* there is screwed the racking-valve B. This is what is usually known among brewers as a "spring-valve"—that is, the valve is normally held to its seat by a stout spring carried by the valve-rod, and the spindle *b*, to which the valve-wheel is secured, is arranged to press against the valve-rod and open the valve as the hand-wheel is turned. The racking-hose C is detachably secured to the valve B in the usual manner. A chambered casing D is secured to the stem of the valve B, inside of the cask, and is provided with a beveled circular aperture, which forms a seat for the correspondingly-faced elbow *d*, into which the racking-tube E is screwed. The elbow *d* is held firmly to its seat by the set-screw *d'*, carried by the yoke *d²*. The set-screw *d'* is adjusted so that the joint between the elbow *d* and the casing D will be perfectly tight, while permitting the elbow to rotate freely on its seat about the axis formed by the set-screw.

The racking-tube E is provided at its free or inner end with a suction-chamber closed at its end and provided with perforations $e$, and, as shown in Fig. 1, a float F is secured thereto. This float is of sufficient capacity to maintain (when immersed) the inlet end of the racking-tube well above the level of the racking-valve. To the inner end of the tube E is also attached one end of a chain or cord G, the opposite end of which is hooked over the hook H, which passes through the head of the cask and can be turned over from the outside of the cask, so as to disengage the end of chain G therefrom without opening the cask. The shavings or chips I are placed in the bottom of the cask in the usual way.

The operation of the apparatus above described will now be readily understood.

Before the cask is filled the end of chain G is placed on the hook H, as shown, the length of the chain being adjusted so as to suspend the inlet end of the tube in the lowest position in which the beer can be drawn without disturbing the chips or the sediment thereon. As the cask is filled the float F will lift the inlet end of the tube E well up into the central portion of the cask. After the beer has been fined, kraeusened, and bunged, and when it is ready for racking, pressure is applied to the cask in the usual way, the valve B is opened, and the beer will flow into the racking-tube through perforations $e$ to the racking-hose C, and thence to the barrels or kegs in which it is delivered to the trade. As the beer flows out the float maintains the inlet end of the tube E well above the level of the chips at all times, and the beer is thus drawn off perfectly bright and clear. As the beer is drawn out the float and tube will descend until the tube reaches the limit fixed by the chain G and becomes stationary. When the beer reaches the level of the lowest perforations $e$, the flow through the tube E will cease. The valve B is then closed and the hose C is uncoupled. The hose leading to the storage vats is attached in its place to the valve B and the valve is opened. The hook H is then turned to disengage chain G, which, with the tube E, drops down onto the shavings in the bottom of the cask, as shown in dotted lines, Fig. 1, and the beer then remaining will flow into storage vats without any loss of time or any waste of beer.

I prefer the construction shown in Fig. 1, in which the float is employed; but, while I consider it a very desirable feature, it is not absolutely essential, and in Fig. 3 I show a modification in which the float is dispensed with, the other features of construction being the same as above described. With this modified construction the tube E is adjusted at the predetermined height, and when the beer is racked down to this level the chain is unhooked and the tube falls down, as before.

I do not intend to limit my invention to any specific details of construction—such, for instance, as the form of yielding joint or connection between the tube E and valve B. Any yielding connection which will be tight and permit the necessary movement of the tube E may be employed, if desired.

Having thus described my invention, what I claim as new, and desire to secure by Letters Patent, is—

1. In apparatus for racking beer and other liquids, the combination of a racking-valve, a movable outlet-tube jointed thereto, a connection for supporting said tube at a predetermined height in the cask, and mechanism for releasing such connection when desired, substantially as shown and described.

2. In apparatus for racking beer and other liquids, the combination of a racking-valve, a movable outlet-tube jointed thereto, a float connected with said tube, and a releasable connection for supporting said tube, substantially as shown and described.

MARION WARREN.

Witnesses:
WALTER H. HILL,
HARRY J. JACKSON.